United States Patent
Diehl et al.

(10) Patent No.: US 9,202,064 B2
(45) Date of Patent: Dec. 1, 2015

(54) METHODS AND DEVICES FOR 3D OBJECT PROTECTION USING SURFACE SUBDIVISION

(71) Applicant: THOMSON LICENSING, Issy de Moulineaux (FR)

(72) Inventors: Eric Diehl, Issy (FR); Olivier Heen, Domloup (FR); Yves Maetz, Melesse (FR); Marc Eluard, Saint-Malo (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/893,831

(22) Filed: May 14, 2013

(65) Prior Publication Data

US 2013/0305380 A1 Nov. 14, 2013

(30) Foreign Application Priority Data

May 14, 2012 (EP) .................................... 12305535

(51) Int. Cl.
*G06F 21/00* (2013.01)
*G06F 21/60* (2013.01)
*G06T 1/00* (2006.01)

(52) U.S. Cl.
CPC .............. *G06F 21/60* (2013.01); *G06T 1/0021* (2013.01)

(58) Field of Classification Search
CPC ................................. G06T 1/0021; G06T 21/60
USPC ................. 726/26, 27, 28, 29, 30; 380/28, 29
See application file for complete search history.

(56) References Cited

U.S. PATENT DOCUMENTS

| 6,678,378 | B1 | 1/2004 | Akiyoshi | |
|---|---|---|---|---|
| 6,842,172 | B2 * | 1/2005 | Kobayashi | 345/419 |
| 6,956,568 | B2 * | 10/2005 | Maekawa et al. | 345/420 |
| 7,081,895 | B2 * | 7/2006 | Papakipos et al. | 345/506 |
| 7,873,237 | B2 * | 1/2011 | Grimaud et al. | 382/276 |
| 8,135,168 | B2 * | 3/2012 | Geyzel et al. | 382/100 |
| 8,665,267 | B2 * | 3/2014 | Joshi et al. | 345/420 |
| 8,750,598 | B2 * | 6/2014 | Bonner et al. | 382/154 |

(Continued)

FOREIGN PATENT DOCUMENTS

| EP | 2400476 | 12/2011 |
|---|---|---|
| EP | 2453429 | 5/2012 |

(Continued)

OTHER PUBLICATIONS

Kolier, David, et al. "Protecting 3d graphics content." Communications of the ACM vol. 48, No. 6, pp. 74-80, Jun. 2005.

(Continued)

*Primary Examiner* — David Garcia Cervetti
(74) *Attorney, Agent, or Firm* — Tutunjian & Bitetto, P.C.

(57) ABSTRACT

A method of protecting a graphical object represented by a list of vertices and a list of surfaces, each surface being defined by a number N vertices. A device selects a surface S with N vertices; computes a new vertex d using a random or pseudo-random function; inserts the new vertex d into the list of vertices; creates N new surfaces S1-SN from the surface S and the new vertex d; and replaces the selected surface S by the new surfaces S1-SN in the list of surfaces. The device preferably iterates the method. The device may shuffle the list of vertices with the inserted vertices. Also provided is an unprotection method and corresponding devices and computer readable storage media.

20 Claims, 2 Drawing Sheets

(56) References Cited

U.S. PATENT DOCUMENTS

| | | | |
|---|---|---|---|
| 8,755,598 B2* | 6/2014 | Geyzel et al. | 382/162 |
| 2002/0138228 A1* | 9/2002 | Faulkner et al. | 702/138 |
| 2003/0122820 A1* | 7/2003 | Doyle | 345/421 |
| 2003/0128209 A1* | 7/2003 | Maekawa et al. | 345/420 |
| 2003/0156109 A1* | 8/2003 | Iwanaga | 345/419 |
| 2004/0212611 A1* | 10/2004 | Huang et al. | 345/419 |
| 2007/0196030 A1* | 8/2007 | Grimaud et al. | 382/276 |
| 2008/0022408 A1 | 1/2008 | Phelps | |
| 2008/0192057 A1* | 8/2008 | Prokopenko et al. | 345/441 |
| 2009/0167758 A1* | 7/2009 | Barczak et al. | 345/420 |
| 2010/0008593 A1* | 1/2010 | Gruetzmacher | 382/244 |
| 2010/0146284 A1* | 6/2010 | Geyzel et al. | 713/176 |
| 2012/0051584 A1* | 3/2012 | Bonner et al. | 382/100 |
| 2012/0120062 A1* | 5/2012 | Eluard et al. | 345/419 |
| 2012/0155755 A1* | 6/2012 | Geyzel et al. | 382/164 |
| 2012/0299915 A1* | 11/2012 | Eluard et al. | 345/420 |
| 2013/0235037 A1* | 9/2013 | Baldwin et al. | 345/420 |

FOREIGN PATENT DOCUMENTS

| | | |
|---|---|---|
| JP | 2002233925 | 8/2002 |
| JP | 2012108911 A * | 6/2012 |

OTHER PUBLICATIONS

Shi, Weidong, et al. "A digital rights enabled graphics processing system." SIGGRAPH/Eurographics Conference on Graphics Hardware: Proceedings of the 21 st ACM SIGGRAPH/Eurographics symposium . . . ; Vienna, Austria. vol. 3, No. 4, p. 17-26, 2006.

Jihane Bennour et al: "3D Object Watermarking" In: "3D Object Processing: Compression, Indexing and Watermarking", Jun. 1, 2009, John Wiley & Sons, XP55010035.

Ohbuchi R et al: "Watermarking Three-D1MENSIONAL Polygonal Models", Proceedings ACM Multimedia 97. Seattle, Nov. 9-13, 1997; [Proceedings ACM Multimedia], Reading, Addison Wesley, US.

Praun E et al: "Robust Mesh 1-13 Watermarking", Proceedings 1999 Eurographics / SIGGRAPH Workshop on Graphics Hardware. Los Angeles, CA, Aug. 8-9, 1999; [SIGGRAPH / Eurographics.

Xiaoyang Mao: "Watermarking 3D geometric models through triangle subdivision", Proceedings of SPIE, vol. 4314, Jan. 1, 2001, pp. 253-260, XP55041368.

Search Report Dated Oct. 23, 2012.

* cited by examiner

METHODS AND DEVICES FOR 3D OBJECT PROTECTION USING SURFACE SUBDIVISION

This application claims the benefit, under 35 U.S.C. §119 of European Patent Application 12305535.2, flied May 14, 2012.

TECHNICAL FIELD

The present invention relates generally to 3-D models and in particular to the protection of graphical objects of such models.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of three-dimensional (3D) objects has been increasing in the last years, particularly with the emergence of metaverses. There are multiple usages for 3D objects: socializing worlds, games, mirroring worlds, simulation tools, but also 3D User interfaces, animation movies and visual effects for television. Generally, 3D virtual objects represent real money value. In socializing worlds and games, players are selling virtual objects or avatars to other players for real money. Building an experienced character within an online game is a very lengthy process that can require hundreds of hours behind the keyboard. The 3D model of a real-world object from a simulation tool allows manufacturing the real (counterfeit) object and selling it. Leaking the 3D model for a scene of the next blockbuster from Hollywood studios may result in bad press for the studios. As can be seen, in many cases, 3D objects are assets of great value for their owner.

Strategies for content protection comprise confidentiality protection—intended to make it impossible for unauthorized users to access the content, e.g. by encryption—and watermarking—intended to make it possible to track a user who has disseminated the content without authorization to do so.

Basic methods of 3D content protection focus on the entire data, i.e. all the data is either encrypted or watermarked (or both), although these methods are somewhat crude.

More subtle ways of protecting 3D content is to protect one or more of its 3D objects. This is possible as 3D content often is made up of a number of distinct objects positioned in a setting. When each 3D object is coded as a separate entity, it becomes possible to protect each of these separately and it is not necessary to protect all of them.

For example, US 2008/0022408 describes a method of 3D object protection by storing the "bounding box" of the object as non-encrypted data in one file and the protected 3D object as encrypted data in a separate file. Any user may access the non-encrypted data, but only authorized users can access the encrypted data; non-authorized users see a basic representation thereof (i.e. the bounding box), such as a parallelepiped instead of a car. However, this method was developed to be used with 3D rendering software and is less suited for multimedia content, such as video and film. In addition, the file format (one file with non-encrypted data and one file with encrypted data) is non-standard and is thus usable only by adapted rendering devices, not standard ones. Indeed, the encrypted data does not respect the syntax of most 3D techniques and can thus normally not be used.

U.S. Pat. No. 6,678,378 describes a solution for protecting a 3D Computer Aided Design (CAD) object by encryption. The solution may encrypt one of the coordinate values of the nodes and the equations for the edges or the contours, by nonlinear or affine transformation, thereby distorting the 3D object or by 'normal' encryption such as RSA.

Problems with this solution is that the calculations may be costly (in particular when using RSA) and that the distortions may not be sufficient to deter a malicious user from using the content nevertheless. In addition, in the case of 'normal' encryption, the 3D object may not be readable at all by a content consuming device—such as a computer or a television—which may be a drawback in some cases.

A digital rights enabled graphics processing system was proposed in 2006 by Shi, W., Lee, H., Yoo, R., and Boldyreva, A: A Digital Rights Enabled Graphics Processing System. In GH '06: Proceedings of the 21st ACM SIGGRAPH/EUROGRAPHICS symposium on Graphics hardware, ACM, 17-26.]. With this system, the data composing the 3D object (collection of vertices, textures) is encrypted. Their decryption is handled within the Graphic Processing Unit, under control of licenses. It is proposed also to use multi resolution meshes to deliver simultaneously a protected and unprotected version of a 3D element. Although the system itself is a real progress towards secure 3D environments, the use of protected scenes with other Virtual Reality Modelling Language (VRML) renderers will lead to interoperability issues.

David Koller and Marc Levoy describe a system for protection of 3D data in which high-definition 3D data is stored in a server. The users have access to a low-definition 3D object that they can manipulate and when a user has chosen a view, a request is sent to the server that returns a two-dimensional JPEG that corresponds to the view. Hence the high-definition 3D data is protected as it is never provided to the users. (See "Protecting 3D Graphics Content" by David Koller and Marc Levoy. Communications of the ACM, June 2005, vol. 48, no. 6.) While this system works well for its intended use, it is not applicable when the full 3D data is to be transferred to a user.

A common problem with the prior art solutions is that they are not format preserving, but that they are based on the encryption of 3D data and that they provide a second set of 3D data that is usable by non-authorized devices so that the user can see something, e.g. a bounding box.

European patent application 10305692.5 describes a format preserving solution in which a 3D object comprising a list of points (i.e. vertices) is protected by permuting the coordinates of at least some of its points. European patent application 10306250.1 describes a similar solution in which the coordinates of at least one dimension of the vertices of a 3D object are permuted independently of the other dimensions. The lists detailing how the points are connected remain unchanged, but the 3D object no longer "makes sense" as these points no longer have the initial values. Advantages of these solutions is that the protected 3D object is readable also by devices that are not able to 'decrypt' the protected 3D object—although it does look very strange—and that the protected 3D object is inscribed in a bounding box of the same size as the original 3D object.

While the latter solutions work well, it will be appreciated that there may be a need for an alternative solution that can enable protection of 3D objects with quick calculations that still enables an unauthorized content consuming device to read and display the 3D object, albeit in a manner that renders the viewing thereof unsatisfactory. The present invention provides such a solution.

SUMMARY OF INVENTION

In a first aspect, the invention is directed to a method of protecting a graphical object represented by a list of vertices and a list of surfaces, each surface being defined by a number N vertices. A device selects a surface S with N vertices; computes a new vertex d using a random or pseudo-random function; inserts the new vertex d in a deterministic place in the list of vertices; creates N new surfaces S1-SN from the surface S and the new vertex d, each new surface S1-SN being in part defined by the new vertex d; and replaces the selected surface S by the new surfaces S1-SN in the list of surfaces.

In a first preferred embodiment, the surface S is selected using a random or pseudo-random function.

In a second preferred embodiment, the new vertex is computed at an offset from the surface S. It is advantageous that the new vertex d is computed as a random or pseudo-random offset from the surface's barycentre.

In a third preferred embodiment, the device further, after the insertion, shuffles the list of vertices using a deterministic function taking a secret key as input.

In a fourth preferred embodiment, the device iterates the method at least twice.

In a second aspect, the invention is directed to a method of unprotecting a protected graphical object represented by a list of vertices and a list of surfaces, each surface being defined by a number N vertices, wherein the protected graphical object has been protected by the addition of a number of vertices in an order and a number of new surfaces constructed from an added vertex and a surface. A device obtains the number of added vertices; and, a number of times equal to the number of added vertices: retrieves in a reverse order an added vertex d not previously retrieved; retrieves N surfaces S1-SN defined by the retrieved vertex d; reconstructs a new surface S from the N retrieved surfaces S1-SN; and replaces the retrieved surfaces S1-SN by the new surface S in the list of surfaces; and outputs an unprotected graphical object.

In a first preferred embodiment, the list of vertices of the protected graphical object was shuffled using a key-based deterministic function during protection, and the device undoes the shuffling of the list of vertices using the key-based deterministic function.

In a third aspect, the invention is directed to a device for protecting a graphical object represented by a list of vertices and a list of surfaces, each surface being defined by a number N vertices. The device comprises a processor configured to, during a number of iterations: select a surface S with N vertices; compute a new vertex d using a random or pseudo-random function; insert the new vertex d in a deterministic place in the list of vertices; create N new surfaces S1-SN from the surface S and the new vertex d, each new surface S1-SN being in part defined by the new vertex d; and replace the selected surface S by the new surfaces S1-SN in the list of surfaces. The processor is further configured to output the protected graphical object and the number of added vertices.

In a first preferred embodiment, the processor is further configured to shuffle the list of vertices using a deterministic function taking a secret key as input.

In a second preferred embodiment, 11. the processor is configured to compute the new vertex at an offset from the surface S.

In a fourth aspect, the invention is directed to a device for unprotecting a protected graphical object represented by a list of vertices and a list of surfaces, each surface being defined by a number N vertices, wherein the protected graphical object has been protected by the addition of a number of vertices in an order and a number of new surfaces constructed from an added vertex and a surface. The device comprises a processor configured to: obtain the number of added vertices; and a number of times equal to the number of added vertices: retrieve in a reverse order an added vertex d not previously retrieved; retrieve N surfaces S1-SN defined by the retrieved vertex d; reconstruct a new surface S from the N retrieved surfaces S1-SN; and replace the retrieved surfaces S1-SN by the new surface S in the list of surfaces; and output an unprotected graphical object.

In a first preferred embodiment, the list of vertices of the protected graphical object was shuffled using a key-based deterministic function during protection, and the processor is further configured to undo the shuffling of the list of vertices using the key-based deterministic function.

In a fifth aspect, the invention is directed to a computable readable storage medium comprising stored instructions that when executed by a processor performs the method the first aspect of the invention.

In a sixth aspect, the invention is directed to a computable readable storage medium comprising stored instructions that when executed by a processor performs the method the second aspect of the invention.

BRIEF DESCRIPTION OF DRAWINGS

Preferred features of the present invention will now be described, by way of non-limiting example, with reference to the accompanying drawings, in which.

DESCRIPTION OF EMBODIMENTS

In some 3D content formats, such as for example Virtual Reality Modelling Language (VRML), OBJ, Maya, 3DS and X3D, the geometry of a 3D graphical object ("3D object") is represented as a mesh of polygon surfaces made up of interconnected points (also called vertices or nodes).

A salient inventive idea of the present invention is to protect a 3D object by using a deterministic function to subdivide at least one polygon surface. The function results in a creation of a new set of polygon surfaces so that the protected 3D object is still understood by any standard 3D model rendering application, but the resulting display becomes distorted.

In the prior art, surface subdivision is a method of iteratively subdividing at least some surfaces of a 3D object to obtain a smoother and more detailed overall surface, thereby improving the quality of the rendering. This is possible since it is easier to approximate a smooth object using several small polygon surfaces than few large ones. The skilled person will appreciate that surface subdivision up until now has been a "one-way" process that has been used to render 3D objects smooth, but that it has never been considered for use in a reversible protection scheme.

Put another way, the method of the present invention receives a 3D object, uses surface subdivision techniques to add "noise" to a representation of the 3D object by adding points and surfaces to the original polygon mesh structure that defines the 3D object to obtain a protected 3D object, and outputs the protected 3D object.

The present description will as an illustrative example use triangular surfaces, but it is to be understood that other mesh structures may be used.

Figure 1:
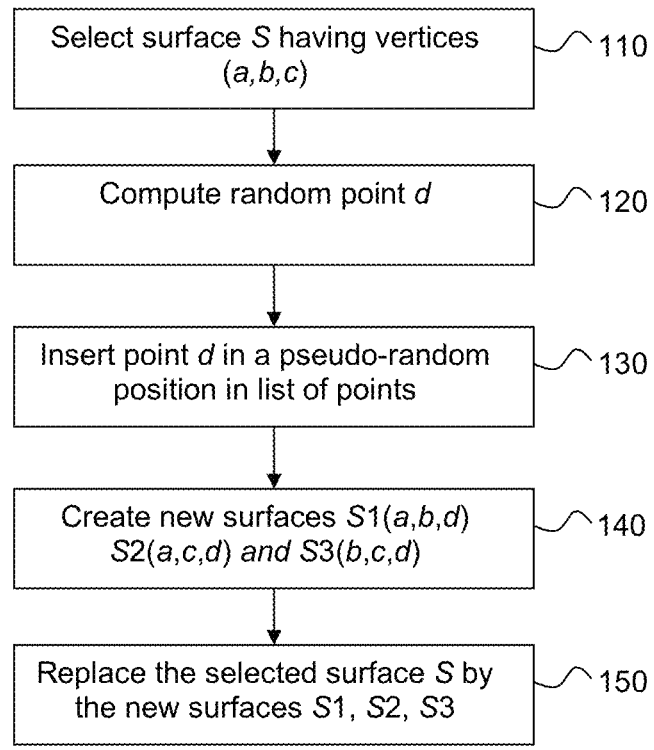
FIG. 1 illustrates a method for protecting a 3D object according to a preferred embodiment of the present invention.

To protect a 3D object comprising a list of points (i.e. vertices) and a list of surfaces preferably defined by indices in the list of vertices, the following preferably iterated method, performed by a sender and illustrated in FIG. 1, may be used:

1. Randomly 110 select a surface S with vertices (a,b,c);
2. Compute 120 a new random point d, the random point d is preferably generated close to the selected surface S;
3. Choose 130 a pseudo-random position and insert the new point d into the list of points at this position; this may require an update of the surface list to take into account the insertion of a new point;
4. Create 140 new surfaces S1($a,b,d$) S2($a,c,d$) and S3($b,c,d$).
5. Replace 150 the selected surface S by the new ones S1, S2, S3.

As already mentioned, the steps may can be iterated to perturb several surfaces.

In the given example, each surface is defined by three points, but it will be appreciated that it is possible to use a greater number of points, such as 4, 5 or 6; indeed, the number of points need not be equal for all the surfaces.

The selection of the target surface S and the computation of the new point d can be completely random. However, as a completely random generation of d may result in a great perturbation, a constrained random generation of the new point d is preferably used. The position of the inserted points must be deterministic and use a secret key so as to enable reversal of the operation.

Figure 2:
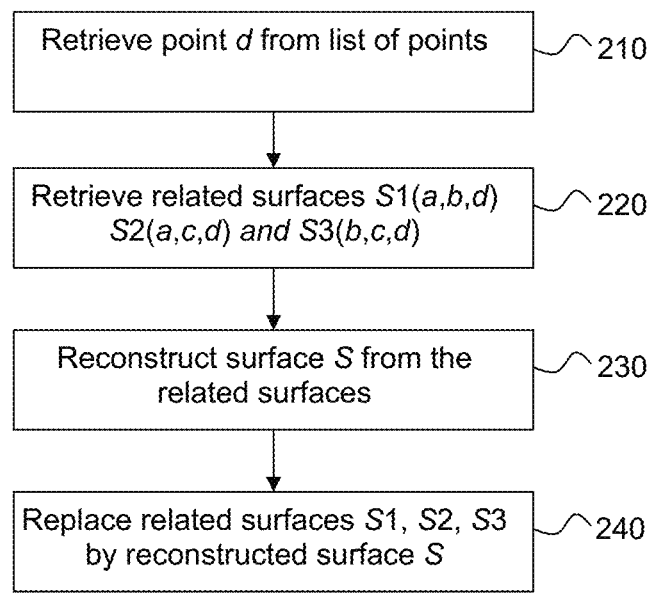
FIG. 2 illustrates a method for unprotecting a protected 3D object according to a preferred embodiment of the present invention.

For each perturbed surface, the original surface is preferably obtained by a receiver by the following method illustrated in FIG. 2:

1. Retrieving 210 the added point d (possible owing to the pseudo-random insertion as will be further described hereinafter);
2. Retrieve 220 the related surfaces S1($a,b,d$), S2($a,c,d$) and S3($b,c,d$);
3. Reconstruct 230 the surface S(a,b,c) from these surfaces; and
4. Replace 240 the related surfaces S1, S2 and S3 by the surface S.

It will be appreciated that while various refinement schemes in themselves are well known in the art, the new, keyed and reversible refinement scheme is a surprising solution that is not found in the art.

Preferred Embodiment of Protection of a Surface

Step 1: Selection of the Surface

The surface S is randomly (or pseudo-randomly) chosen from the original set of surfaces. As a variant, the surface S is chosen from the set of surfaces comprising the original surfaces and the surfaces created during prior iterations of the protection method. As a further variant, the surfaces are chosen using a selection criterion such as for example focusing on the smallest surfaces to perturb the details of the 3D object. As another variant, all surfaces of the object will be affected by the perturbation.

Step 2: Computation of the Random Points to be Added

A new point is created in the proximity of the selected surface to limit the effects of the perturbation. The new point may be generated in a number of ways. For example, a point may be added to the barycentre of the selected surface and then moved according to the values of a random or pseudo-random vector. It is also possible to define a virtual sphere with a randomly chosen radius, the centre of the sphere being chosen randomly in the selected surface. The radius is chosen between a pre-selected low value (possibly zero) and a pre-selected high value that depends on the desired degree of perturbation. Then, the new point is determined by randomly choosing two angles $\theta$ and $\phi$, as is well known in the art. In a further variant, the new point is computed from the surface, for example the centroid.

It will be appreciated that it is possible to determine the degree of the disturbance to the 3D object provided by the invention by choosing different values for the variables used for the generation of the points. If the vectors or spheres can have a large expected value, this causes greater modifications to the 3D objects than if the expected value is small.

Step 3: Insert the New Points

The new point is added to the point list in a reversible manner. A straightforward way of doing this is to add each new point to the end of the point list, which does not disturb the order of the original points; then, to add a level of security, the point list may be shuffled, e.g. using a key-based pseudo-random number generator, i.e. a key is used as a seed to generate the necessary random number (and the subsequently generated random numbers are used for subsequent iterations).

It is however also possible to use a key-based pseudo-random number generator to generate the position in the list into which the new point is to be inserted and to change the indices of the existing surfaces who are affected by the insertion, although it should be noted that this variant requires a greater number of operations.

Step 4: Construction of New Surfaces

The selected surface is split into three new surfaces (as a triangular mesh is used) by listing the possible pairs of defining (i.e. 'corner') points from the selected surface and completing these pairs with the new point. This results in a set of three new surfaces.

Step 5: Insert New Surfaces

The selected surface is removed from the list of surfaces and the new surfaces are added.

The protected 3D object may then be output, for example by sending it to a receiver. To enable easy unprotection, the number of added points is also output.

It will be appreciated that it is advantageous for the transmitter to inform the receiver of the number of iterations, i.e. the number of added surfaces and points. The disturbance to the 3D object provided by the method, partly dependent on the expected value used for the point generation, also depends on the number of iterations: the disturbance is likely to increase with the number of added surfaces.

Preferred Embodiment of Unprotection of a Protected Surface

Step 1: Retrieve the Added Points

The receiver, knowing the number of added points, first retrieves the added points essentially by using the insertion method 'backward'. For example, in case each added point was added to the end of the list of points, then the receiver simply retrieves a number of points equal to the added number of points, starting from the end of the list and working upwards. In the variant where the points are added to the end of the list that is then shuffled, the numbers generated are used to undo the shuffling and then the added points may be retrieved, preferably in reverse order. The other variants work in an analogous manner.

The receiver uses the same key as the sender as seed. The key may be predetermined and shared by the receiver and the sender, but it is also possible for the sender to provide the key to the receiver using any suitable method known in the art. It is preferred to protect the key during transmission from the sender to the receiver and, possibly, also to ensure that only the receiver can use the key, but this is beyond the scope of the present invention.

Step 2: Retrieve the Added Surfaces

Retrieve the surfaces related to the retrieved point d: S1($a$,$b$,$d$) S2($a$,$c$,$d$) and S3($b$,$c$,$d$). As the point d was inserted at the protection stage, no other surfaces than the three added surfaces created with point d use the retrieved point. Therefore these surfaces can easily be found in the list of surfaces.

Step 3: Reconstruct the Surface

From the set of surfaces S1($a$,$b$,$d$) S2($a$,$c$,$d$) and S3($b$,$c$,$d$), the points a, b and c are extracted. Indeed, these three surfaces were defined using four points. By removing one of them (d), the remaining three points (a,b,c) can be used to reconstruct the original surface S.

Step 4: Insert the Reconstructed Surface

The added surfaces S1, S2 and S3 are replaced by the reconstructed surface S.

Step 5: Update of the Object Description

When a point is added or removed from the list of vertices, the list of surfaces must be updated to keep the initial geometry. Depending of the implementation, this operation can either be performed at each iteration or at the end of the iterations.

It will be appreciated that the unprotection method may be performed in different, equivalent, ways. For example, it may be performed using a number of iterations equal to the added number of points, each iteration comprising: retrieving one point, retrieving the added surface and so on. It may also be performed by retrieving all the added points before any other step is performed. The skilled person will appreciate that other equivalent minor variations are possible.

Figure 3:
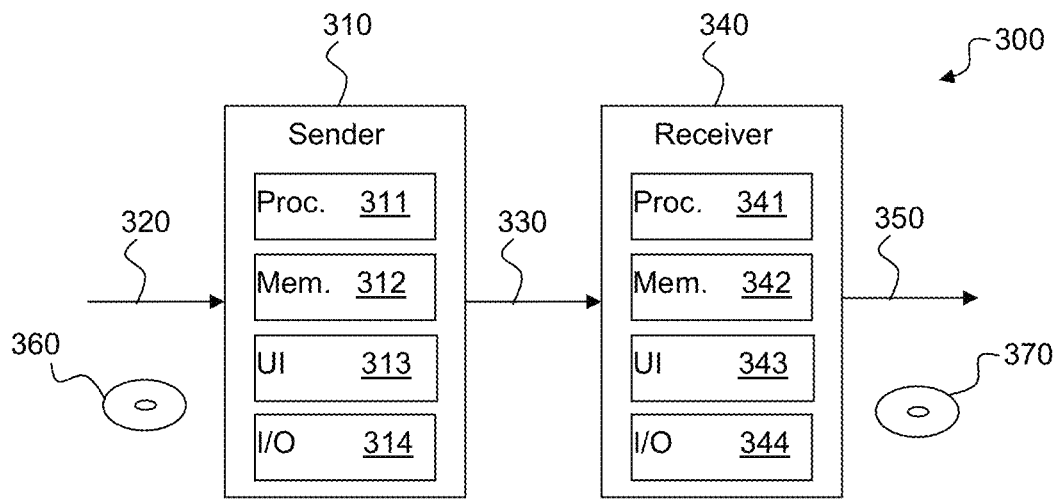
FIG. 3 illustrates a system for protecting a 3D object according to a preferred embodiment of the present invention.

FIG. 3 illustrates a system 300 for protecting a digital object such as a 3D object according to a preferred embodiment of the present invention As a non-limitative example, the points correspond to the vertices of the surfaces composing the graphical object and are expressed in 3D coordinates. The transformation may be performed on the static part (Coordinate node in VRML syntax) or the animation part (CoordinateInterpolator node in VRML syntax), or preferably both. In other words, it is the representation of the 3D object that is protected, which makes the correct rendering of the object impossible.

The system 300 comprises a sender 310 and a receiver 340, each comprising at least one processor 311, 341, memory 312, 342, preferably a user interface 313, 343, and at least one input/output unit 314, 344. The sender 310 may for example be a personal computer or a workstation, while the receiver 320 for example may not only be a personal computer or a workstation, but also a television set, a video recorder, a set-top box or the like.

The sender 310 can receive a 3D object via a first connection 330, send the protected 3D object to the receiver via a second connection 340 and the receiver can output the unprotected 3D object via connection 350.

A first software program storage medium 360 stores instructions that, when executed by a processor performs the protection method according to any described embodiment. A second software program storage medium 370 stores instructions that, when executed by a processor performs the unprotection method according to any described embodiment.

It will be appreciated that the number of iterations is out of scope of the invention. However, the receiver should know the number of added points in order to remove them correctly. As for transmission of the key, many different well-known techniques could be used for providing this information to the receiver, such as for example using metadata, using a fixed number of iterations, and using a number of iterations proportional to the number of points.

Figure 4:
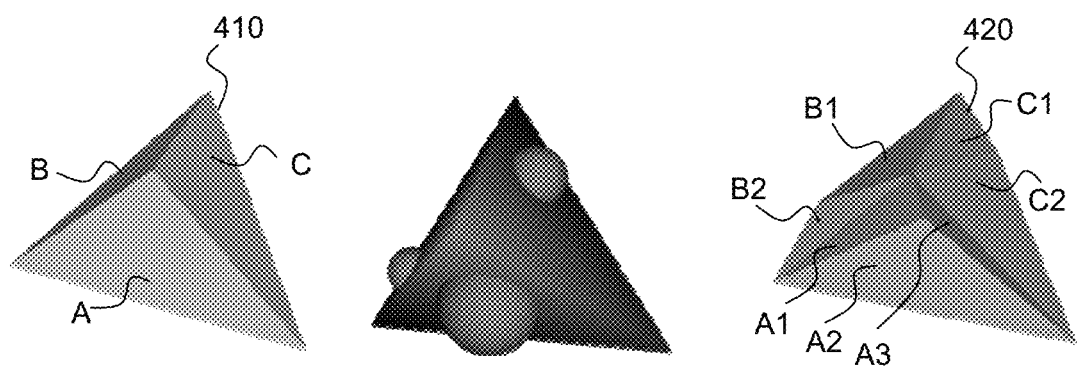
FIG. 4 illustrates an exemplary 3D object in different phases of the protection method according to a preferred embodiment of the present invention.

FIG. 4 illustrates an exemplary 3D object in different phases of the protection method according to a preferred embodiment of the present invention. The 3D object 410 is a 3D pyramid object shown on the left. The image in the middle shows randomly chosen spheres for each of the three visible surfaces. The image to the right shows the resulting pyramid (i.e. the protected 3D object 420) with the additional surfaces. The surface A in the picture on the left is split into the surfaces A1, A2, and A3 in the image on the right, and surfaces B and C are respectively split into the surfaces B1, B2, B3 and C1, C2, C3. It is to be noted that B3 and C3 are not visible in the figure.

While the invention has been described for three dimensions, it may also be applied to protect objects in any other number of dimensions.

It will thus be appreciated that the present invention can provide a mechanism for protection of digital objects such as 3D models, and that the mechanism can visually differentiate protected and non-protected models for non-authorized users. It will also be appreciated that the protected 3D object (and the scene comprising the 3D object) can always be rendered, although it will be more or less recognizable.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of protecting a graphical object represented by a list of vertices and a list of surfaces, each surface being defined by a number N vertices, the method comprising:
    selecting a surface S with N vertices;
    generating an additional vertex d using a random or pseudo-random function;
    adding the additional vertex d in a deterministic place in the list of vertices;
    creating, using a special purpose computer including a processor, N additional surfaces S1-SN from the N vertices of surface S and the additional vertex d, each additional surface S1-SN being in part defined by the additional vertex d; and
    replacing the selected surface S by the additional surfaces S1-SN in the list of surfaces.

2. The method of claim 1, wherein the surface S is selected using a random or pseudo-random function.

3. The method of claim 1, wherein the additional vertex d is computed at an offset from the surface S.

4. The method of claim 3, wherein the additional vertex d is computed as a random or pseudo-random offset from the surface's barycentre.

5. The method of claim 1, further comprising shuffling the list of vertices using a deterministic function taking a secret key as input after the inserting the new vertex.

6. The method of claim 1, wherein the method including the selecting, generating, adding, creating, and replacing is iterated at least twice.

7. A non-transitory computable-readable storage medium comprising stored instructions that when executed by a processor on a special purpose computer performs the method of claim 1.

8. A method of unprotecting a protected graphical object represented by a list of vertices and a list of surfaces, each surface being defined by a number N vertices, wherein the protected graphical object has been protected by the addition of a number of vertices in an order and a number of new surfaces constructed from an added vertex and a surface, the method comprising:
obtaining a number of added vertices, and a number of times equal to the number of added vertices:
retrieving in a reverse order an added vertex d not previously retrieved;
retrieving N surfaces Si-SN defined by the retrieved vertex d;
reconstructing a new surface S from the N retrieved surfaces S1-SN from vertices defining surfaces S1-SN except for the retrieved vertex d; and
replacing the retrieved surfaces S1-SN by the new surface S in the list of surfaces; and
outputting an unprotected graphical object.

9. The method of claim 8, wherein the list of vertices of the protected graphical object was shuffled using a key-based deterministic function during protection, the method further comprising undoing the shuffling of the list of vertices using the key-based deterministic function.

10. A non-transitory computable-readable storage medium comprising stored instructions that when executed by a processor performs the method of claim 8.

11. A device for protecting a graphical object represented by a list of vertices and a list of surfaces, each surface being defined by a number N vertices, the device comprising a processor configured to, during a number of iterations:
select a surface S with N vertices;
generate an additional vertex d using a random or pseudo-random function;
add the additional vertex d in a deterministic place in the list of vertices;
create N additional surfaces S1-SN from the N vertices of surface S and the additional vertex d, each additional surface S1-SN being in part defined by the additional vertex d; and
replace the selected surface S by the additional surfaces S1-SN in the list of surfaces;
the processor further being configured to output the protected graphical object and the number of added vertices.

12. The device of claim 11, wherein the processor is further configured to shuffle the list of vertices using a deterministic function taking a secret key as input.

13. The device of claim 11, wherein the processor is configured to compute the additional vertex at an offset from the surface S.

14. A device for unprotecting a protected graphical object represented by a list of vertices and a list of surfaces, each surface being defined by a number N vertices, wherein the protected graphical object has been protected by the addition of a number of vertices in an order and a number of new surfaces constructed from an added vertex and a surface, the device comprising a processor configured to:
obtain a number of added vertices, and a number of times equal to the number of added vertices:
retrieve in a reverse order an added vertex d not previously retrieved;
retrieve N surfaces S1-SN defined by the retrieved vertex d;
reconstruct a new surface S from the N retrieved surfaces S1-SN from vertices defining surfaces S1-SN except for the retrieved vertex d; and
replace the retrieved surfaces S1-SN by the new surface S in the list of surfaces; and
output an unprotected graphical object.

15. The device of claim 14, wherein the list of vertices of the protected graphical object was shuffled using a key-based deterministic function during protection, and the processor is further configured to undo the shuffling of the list of vertices using the key-based deterministic function.

16. A device for protecting a graphical object represented by a list of vertices and a list of surfaces, each surface being defined by a number N vertices, the device comprising, during a number of iterations:
means for selecting a surface S with N vertices;
means for generating an additional vertex d using a random or pseudo-random function;
means for adding the additional vertex d in a deterministic place in the list of vertices;
means for creating N additional surfaces S1-SN from the N vertices of surface S and the additional vertex d, each additional surface S1-SN being in part defined by the additional vertex d;
means for replacing the selected surface S by the additional surfaces S1-SN in the list of surfaces; and
means for outputting the protected graphical object and the number of added vertices.

17. The device of claim 16, further comprising means for shuffling the list of vertices using a deterministic function taking a secret key as input.

18. The device of claim 16, further comprising means for computing the additional vertex d at an offset from the surface S.

19. A device for unprotecting a protected graphical object represented by a list of vertices and a list of surfaces, each surface being defined by a number N vertices, wherein the protected graphical object has been protected by the addition of a number of vertices in an order and a number of new surfaces constructed from an added vertex and a surface, the device comprising:
means for obtaining a number of added vertices, and a number of times equal to the number of added vertices:
means for retrieving in a reverse order an added vertex d not previously retrieved;
means for retrieving N surfaces S1-SN defined by the retrieved vertex d;
means for reconstructing a new surface S from the N retrieved surfaces S1-SN from the vertices defining surfaces S1-SN except for the retrieved vertex d; and
means for replacing the retrieved surfaces S1-SN by the new surface S in the list of surfaces; and
means for outputting an unprotected graphical object.

20. The device of claim 19, wherein the list of vertices of the protected graphical object was shuffled using a key-based deterministic function during protection, the device further comprising means to undo the shuffling of the list of vertices using the key-based deterministic function.

* * * * *